United States Patent [19]
Ludtke et al.

[11] Patent Number: 6,131,129
[45] Date of Patent: *Oct. 10, 2000

[54] COMPUTER SYSTEM WITHIN AN AV/C BASED MEDIA CHANGER SUBUNIT PROVIDING A STANDARIZED COMMAND SET

[75] Inventors: Harold Aaron Ludtke, San Jose, Calif.; Harumi Kawamura, Tokyo; Hiraku Inoue, Kanagawa, both of Japan

[73] Assignees: Sony Corporation of Japan, Tokyo, Japan; Sony Electronics, Inc., Park Ridge, N.J.

[ * ] Notice: This patent is subject to a terminal disclaimer.

[21] Appl. No.: 09/108,868

[22] Filed: Jul. 1, 1998

Related U.S. Application Data

[63] Continuation of application No. 60/054,263, Jul. 30, 1997.

[51] Int. Cl.[7] .............................. G06F 13/00; G11B 17/22
[52] U.S. Cl. ................................. 710/5; 710/5; 710/105; 369/36; 369/37; 369/192
[58] Field of Search ................................... 710/5, 33, 63, 710/65, 105, 104, 129; 395/200.83; 369/30, 37, 34, 36, 192; 709/253

[56] References Cited

U.S. PATENT DOCUMENTS

| | | | |
|---|---|---|---|
| 5,182,551 | 1/1993 | Goto | 340/825.24 |
| 5,187,695 | 2/1993 | Schindler et al. | 369/37 |
| 5,214,628 | 5/1993 | Langman et al. | 369/37 |
| 5,615,345 | 3/1997 | Wanger | 395/309 |
| 5,726,956 | 3/1998 | Kanno | 369/30 |
| 5,787,259 | 7/1998 | Haroun et al. | 395/200.83 |
| 5,845,283 | 12/1998 | Williams et al. | 707/101 |
| 5,919,261 | 7/1999 | Aoki et al. | 713/300 |
| 5,959,536 | 9/1999 | Chambers et al. | 340/636 |
| 5,973,748 | 10/1999 | Horiguchi et al. | 348/554 |

FOREIGN PATENT DOCUMENTS

| | | | |
|---|---|---|---|
| 0 388 054 A1 | 3/1990 | European Pat. Off. | G11B 17/22 |
| 0 482 958 A2 | 10/1991 | European Pat. Off. | H04L 12/40 |
| 0 612 157 A2 | 1/1994 | European Pat. Off. | H04B 1/20 |
| 0 627 823 A2 | 5/1994 | European Pat. Off. | H04B 1/20 |
| 0 658 010 A1 | 12/1994 | European Pat. Off. | H04B 1/20 |
| 96/06393 | 2/1996 | WIPO | G06F 9/44 |
| WO 97/37202 | 10/1997 | WIPO | G01L 3/00 |
| 99/06997 | 2/1999 | WIPO | G11B 19/02 |
| 99/06998 | 2/1999 | WIPO | G11B 27/00 |

OTHER PUBLICATIONS

"Information Technology–Small Computer Systems Interface–2", Draft X3T9.2 Rev. 10L, Sep. 7, 1993.
"AV/C Digital Interface Command Set General Specification", Version 3.0 1394 Trade Association, Apr. 15, 1998.

*Primary Examiner*—Thomas C. Lee
*Assistant Examiner*—Chun Cao
*Attorney, Agent, or Firm*—Wagner, Murabito & Hao LLP

[57] ABSTRACT

In a home audio visual network including a plurality of devices coupled via an IEEE 1394 bus, a system for accessing a media changer mechanism of a multi-item media player. The multi-item media player stores a plurality of media items and can play any of the plurality of media items. A media changer mechanism having a plurality of slots for storing the plurality of media items is included within the multi-item media player. A computer system is built into the multi-item media player. A software based media changer model executes on the computer system, and in turn, causes the computer system to implement a method of accessing the media changer mechanism. In so doing, the computer system interfaces with a plurality of devices coupled to the multi-item media player via an IEEE 1394 communications link of an IEEE 1394 based network and provides a standardized command set for the media changer mechanism. The media changer model provides a set of standardized commands that allow the plurality of devices on the network to access the media changer mechanism and access any of the plurality of media items stored therein.

23 Claims, 19 Drawing Sheets

300

| The General Subunit Identifier Descriptor | |
|---|---|
| Address | Contents |
| 00 00$_{16}$ | Descriptor_length |
| 00 01$_{16}$ | |
| 00 02$_{16}$ | Size_of_object_ID |
| 00 03$_{16}$ | Number_of_root_object_lists (n) |
| 00 04$_{16}$ | |
| 00 05$_{16}$ | Root_object_list_id_0 |
| : | |
| : | : |
| : | Root_object_list_id_n-1 |
| XX XX$_{16}$ | Subunit_dependent_length |
| : | Subunit_dependent_information |
| : | |
| XX XX$_{16}$+ Subunit_dependent_length | |
| YY YY$_{16}$ | Manufacturer_dependent_length |
| : | Manufacturer_dependent_information |
| : | |
| YY YY$_{16}$+ Manufacturer _dependent_length | |

| Address Offset | Contents |
|---|---|
| $00_{16}$ | Subunit_dependent_information_attributes |
| $01_{16}$ | Media_capacity (MSB) |
| $02_{16}$ | (LSB) |
| $03_{16}$ | Number_of_load_positions (m) |
| $04_{16}$ | (MSB) |
| ⋮ | Load_position (0) |
| ⋮ | (LSB) |
| | ⋮ |
| ⋮ | (MSB) |
| ⋮ | Load_position (m - 1) |
| ⋮ | (LSB) |
| ⋮ | Number_of_supported_physical_media_types (n) |
| ⋮ | (MSB) |
| ⋮ | Physical_media_type (0) |
| ⋮ | (LSB) |
| | ⋮ |
| ⋮ | (MSB) |
| ⋮ | Physical_media_type (n - 1) |
| ⋮ | (LSB) |

| Address Offset | Contents |
|---|---|
| $00_{16}$ | Specification_length (type_dependent_length + 3) |
| $01_{16}$ | Physical_media_type |
| $02_{16}$ | |
| $03_{16}$ | Type_dependent_length |
| ⋮ | Type_dependent_information |
| ⋮ | |
| $03_{16}$ + Type_dependent_length | |

| Physical_media_type | Value | Comment |
|---|---|---|
| 12 cm disc | $01_{16}$ | Standard CD / DVD form |
| 8 cm disc | $02_{16}$ | Small CD form |
| MD | $03_{16}$ | MiniDisc |
| 30 cm disc | $04_{16}$ | Standard LaserDisc |
| 20 cm disc | $05_{16}$ | Small LaserDisc |
| DVCR standard cassette | $31_{16}$ | |
| DVCR small cassette | $32_{16}$ | |
| DVCR medium cassette | $33_{16}$ | |
| VHS cassette | $22_{16}$ | |
| VHS-C cassette | $23_{16}$ | |
| Beta cassette | $41_{16}$ | |
| DAT cassette | $51_{16}$ | |
| 8 mm cassette | $52_{16}$ | |
| Standard audio cassette | $53_{16}$ | |
| All others | All others | Reserved for future definition |

| List_type | Value | Comment |
|---|---|---|
| Slot List | $80_{16}$ | Objects in this list represent the slots in the changer. There is only one of these lists, and it is required. This is a root list (referenced from the subunit identifier descriptor). |
| Content List(s) | See notes | contents of the media in that slot. Each list in this hierarchy will the *list_type* values will be based on the media format. |
| Preset List(s) | $81_{16}$ | The changer may support user-defined presets for favorite selections among the content in the changer. There may be several of these preset lists supported by a changer. |

| General AV/C Slot List Descriptor ||
|---|---|
| Address | Contents |
| $00\ 00_{16}$ | Descriptor_length |
| $00\ 01_{16}$ | |
| $00\ 02_{16}$ | List_type |
| $00\ 03_{16}$ | Attributes |
| $00\ 04_{16}$ ⋮ ⋮ | List_specific_information |
| ⋮ ⋮ | Number_of_slots (n) |
| ⋮ ⋮ ⋮ | Slot (0) |
| ⋮ | ⋮ |
| ⋮ ⋮ ⋮ | Slot (N - 1) |

| Attribute Value | Name | Meaning |
|---|---|---|
| 1xxxxxxx | Has_more_attributes | If this bit is set to 1, then the next byte is also an attributes byte. If this bit is 0, then the next byte is as defined for this structure. |
| x1xxxxxx | Skip | If this bit is set to 1, the reader of this list must skip the list or object entry because it currently does not contain valid or useful information (however, the fields do exist in the structure).<br><br>When this bit is clear, then the information in the list or object entry is valid. |
| xx1xxxxx | Has_child_ID | VALID ONLY FOR THE OBJECT ENTRY DESCRIPTOR<br><br>If this bit is set to 1, then the object entry has a child_list_ID field. If it is 0, then this field does not exist in the structure. |
| xxx1xxxx | Has_object_ID | VALID ONLY FOR THE OBJECT LIST DESCRIPTOR<br><br>If this bit is set to 1, then all objects in this list have an ID. If it is zero, then all objects in this list do NOT have an ID. |
| xxxx1xxx | Has_specific_info | If this bit is set to 1, then the descriptor has a descriptor specific_information field. If this bit is 0, then this field does not exist in the structure. |
| All others | | Reserved for future specification |

| General AV/C Object Descriptor | |
|---|---|
| Address Offset | Contents |
| $00_{16}$ | Descriptor_length |
| $01_{16}$ | |
| $02_{16}$ | Entry_type |
| $03_{16}$ | Attributes |
| ⋮ | Child_list_ID |
| ⋮ | Object_ID |
| ⋮ | Entry_specific_information |

| Slot List List_Specific_Information | |
|---|---|
| Address Offset | Contents |
| $00_{16}$ | List_specific_information_length |
| $01_{16}$ | |
| $02_{16}$ | Attributes_of_slot_list_specific_information |
| $03_{16}$ | Last_update |
| $04_{16}$ | |
| $05_{16}$ | |
| $06_{16}$ | |
| $07_{16}$ | Empty_slots |
| ⋮ | |
| ⋮ | Slot_list_ID |
| ⋮ | Slot_list_name_length |
| ⋮ | Slot_list_name |

| Address offset | Msb | | | | | | | lsb |
|---|---|---|---|---|---|---|---|---|
| 00₁₆ | 0 | Reserved (4 bits) | | | | Year | Month (4 bits) | |
| 01₁₆ | Month (4 bits) | | | Day (5 bits) | | | | am/pm |
| 02₁₆ | Hours (4 bits) | | | | Minutes (6 bits) | | | |
| 03₁₆ | Minutes (6 bits) | | | Seconds (6 bits) | | | | |

| Address offset | Msb | | | | | | | lsb |
|---|---|---|---|---|---|---|---|---|
| 00₁₆ | Slot(7) | | | -------- | | | | Slot (0) |
| 01₁₆ | Slot(15) | | | -------- | | | | Slot (8) |
| ⋮ | | | | -------- | | | | |
| N/8₁₆ | 0 | 0 | Slot (N-1) | | -------- | | | |

| Address Offset | Contents |
|---|---|
| 00₁₆ | Entry_specific_information_size |
| 01₁₆ | Entry_specific_attributes |
| 02₁₆ | Installed_media_format |
| 03₁₆ | |
| 04₁₆ | Installed_physical_media_type |
| 05₁₆ | Number_of_supported_physical_media_types (n) |
| 06₁₆ | Supported_physical_media_type (0) |
| 07₁₆ | ⋮ |
| 08₁₆ | Supported_physical_media_type (n - 1) |
| 09₁₆ | Load_position |
| ⋮ | |
| ⋮ | |

| Attribute Bit | Attribute Name | Meaning |
|---|---|---|
| 1xxxxxxx | Has_more_attributes | is as defined for this structure |
| xxxxxxx1 | Present | 1 = Media is present in this slot<br>0 = No media present in this slot |
| xxxxxx1x | Assigned | 1 = Media is assigned to this slot<br>0 = No media is assigned to this slot |
| xxxxx1xx | Unreadable | 1 = The media in this slot cannot be read<br>0 = The media in this slot can be read |
| xxxx1xxx | Format_valid | 1 = The data in the installed_media_format field is valid<br>0 = The data in the installed_media_format field is not valid |
| All others | ——— | Reserved for future definition |

| Media_type (high) | Value | Media_type (low) | Value |
|---|---|---|---|
| CD | $01_{16}$ | CD-DA<br>Video-CD<br>Data | $01_{16}$<br>$02_{16}$<br>$0E_{16}$ |
| MD | $03_{16}$ | Premastered<br>Recordable<br>Hybrid<br>Data | $01_{16}$<br>$02_{16}$<br>$03_{16}$<br>$0E_{16}$ |
| DVD | $05_{16}$ | Movie<br>Data | $01_{16}$<br>$0E_{16}$ |

| Opcode | Value | Support level (by ctype) | | | Comments |
|---|---|---|---|---|---|
| | | C | S | N | |
| Import Media | XX$_{16}$ | | | | Add a new piece of media to an empty slot in the subunit |
| Export Media | XX$_{16}$ | | | | Remove a piece of media from the subunit |
| Load Media | XX$_{16}$ | | | | Move a piece of media from a slot to a drive subunit |
| Unload Media | XX$_{16}$ | | | | Return a piece of media from a drive subunit to its assigned slot |

| | Msb | | | | | | | lsb |
|---|---|---|---|---|---|---|---|---|
| Opcode | \multicolumn{8}{c}{Import Media (XX$_{16}$)} |
| Operand (0) | \multicolumn{8}{c}{Slot_number} |
| Operand (1) | | | | | | | | |
| Operand (2) | \multicolumn{8}{c}{Status} |

| Response Type | Returned Status | Meaning |
|---|---|---|
| Accepted | $00_{16}$ | The command was performed with no problem. |
| Rejected | $01_{16}$ | The command was rejected because of a slot assignment conflict. The controller must first EXPORT the media from this slot. |
| Rejected | $02_{16}$ | The command was rejected because the affected cartridge had one or more media installed in a drive. |
| Rejected | $03_{16}$ | The specified *slot_number* was not valid. |
| — | All others | Reserved for future definition |

| | Msb | | | | | | | lsb |
|---|---|---|---|---|---|---|---|---|
| Opcode | \multicolumn{8}{c|}{Export Media ($XX_{16}$)} |
| Operand (0) | \multicolumn{8}{c|}{Slot_number} |
| Operand (1) | | | | | | | | |
| Operand (2) | \multicolumn{8}{c|}{Status} |

| | Msb | | | | | | | lsb |
|---|---|---|---|---|---|---|---|---|
| Opcode | Load Media (XX$_{16}$) | | | | | | | |
| Operand (0) | Load_position | | | | | | | |
| Operand (0) | Control | | | | | | | |
| Operand (1) | Object_number | | | | | | | |
| Operand (2) | | | | | | | | |

| | Msb | | | | | | | lsb |
|---|---|---|---|---|---|---|---|---|
| Opcode | Unload Media (XX$_{16}$) | | | | | | | |
| Operand (0) | Load_position | | | | | | | |
| Operand (0) | Control | | | | | | | |
| Operand (1) | Object_number | | | | | | | |
| Operand (2) | | | | | | | | |

FIG. 22

COMPUTER SYSTEM WITHIN AN AV/C BASED MEDIA CHANGER SUBUNIT PROVIDING A STANDARIZED COMMAND SET

This application application claims the benefit of the earlier filed provisional application Ser. No. 60/054,263 filed on Jul. 30, 1997.

FIELD OF THE INVENTION

The field of the present invention pertains to audio-video systems. More particularly, the present invention pertains to interfacing audiovisual media devices via an IEEE 1394 bus using industry standard AV/C protocols.

BACKGROUND OF THE INVENTION

A typical home audio-visual equipment setup includes a number of components. For example, a radio receiver, a CD player, a pair of speakers, a television, a VCR, a tape deck, and alike. Each of these components is connected to each other via a set of wires. One component is usually the central component of the home audiovisual system. This is usually the radio receiver, or the tuner. The tuner has a number of specific inputs for coupling the other components. The tuner has a corresponding number of control buttons or control switches which provide a limited degree of controllability and inter-operability for the components. The control buttons and control switches are usually located on the front of the tuner. In many cases, some or all of these buttons and switches are duplicated on a hand-held remote control unit. A user controls the home audiovisual system by manipulating the buttons and switches on the front of the tuner or, alternatively, manipulating buttons on the hand-held remote control unit.

This conventional home audiovisual system paradigm has become quite popular. As the number of new consumer electronics devices for the home audiovisual system has grown and as the sophistication and capabilities of these devices have increased, a number of problems with the conventional paradigm have emerged. One such problem is incompatibility between devices in the home audiovisual system. Consumer electronic devices from one manufacturer often couple to an audiovisual system in a different manner than similar devices from another manufacturer.

For example, a multi-disc DVD player made by one manufacturer may not properly couple with a television made by another manufacturer and, thus, may not allow full access to all of its capabilities. For example, the multi-disc player might not incorporate hardware (e.g., specific inputs and outputs) which enables the more sophisticated functions of the multi-disc DVD player to be used with devices made by other manufactures. As such, these functions may not be usable with simpler, less sophisticated televisions or cable decoders.

Home AV (audio-visual) systems which include multi-disc player devices are particularly problematic because of the large volume of information the multi-disc player is able to contain and access. For example, there are several multi-disc compact disc (CD) players on the market that can hold 200 CDs or more. Considering the fact that a typical CD may include 10 or more individual "tracks" (e.g., songs), a fully loaded multi-disc player can present the user with an extremely large, virtually indecipherable mountain of information. This problem may be made even more difficult given the fact that there may be no intuitive, readily usable way to access the various tracks with any other remote control (e.g., the tuner's remote control) of the home AV system.

While the emergence of networking and interface technology (e.g., IEEE 1394 serial communication bus and the wide spread adoption of digital systems) offers prospects for correcting the above problems, there is still no coherent, open, extensible architecture which can provide for intelligent content navigation and selection with multi-disc player devices. There is no system for keeping a user informed by providing status reporting and notification between devices within a home AV system. As IEEE 1394 technology spreads across product lines, it is necessary to define logical models and command sets for various devices or functional groups such as VCR's and multi-disc players.

SUMMARY OF THE INVENTION

Thus, what is required is a media changer device model which is media type independent and thereby supports any type of media (CD's, MiniDiscs, DVCR video tapes, DAT Tapes, 8 mm tapes, etc.) in any combination (a changer may have CD and DVD discs installed, etc.). What is required is a model which supports enhancements to the AV/C protocol for content navigation and selection, providing both a detailed and a general abstraction of content discovery and description, and allowing for a range of controllers (from very simple to very complex) to make use of its features. What is required is a model that supports status reporting and notification mechanisms so that controllers are aware of what is occurring within the device, thus keeping the user informed. This is especially important in a distributed network environment where the device may be in a closet or a different room of the house from the controller/user. The present invention is a method and system that satisfies the above requirements.

In a typical embodiment, such as, for example, a home AV network including a plurality of devices coupled via an IEEE 1394 bus, the present invention comprises a system for accessing a media changer mechanism. The multi-item (e.g., multi-disc) media changer stores a plurality of media discs and can select any of the plurality of media discs. A media changer mechanism having a plurality of slots for storing the plurality of media discs may be included within the multi-disc media player. Alternatively, the media changer mechanism may be a "stand alone" device that is attached to a separate player device (or perhaps merely located near the player device). A computer system is built into to the multi-disc media player. A software-based media changer model executes on the computer system, and in turn, causes the computer system to implement a method of accessing the media changer mechanism. In so doing, the computer system interfaces with a plurality of devices coupled to the multi-disc media player via an IEEE 1394 communications link of an IEEE 1394 based network and provides a standardized command set for the media changer mechanism. The media changer model provides a set of standardized commands that allow the plurality of devices on the network to access the media changer mechanism and access any of the plurality of media discs stored therein.

In this manner, the present invention provides a model which is media type independent and, thereby, supports any type of media (CD's, MiniDiscs, DVCR video tapes, DAT Tapes, 8 mm tapes, etc.) in any combination (a changer may have CD and DVD discs installed, etc.). The model of the present invention supports enhancements to the AV/C protocol for content navigation and selection, providing both a detailed and a general abstraction of content discovery and description, and allowing for a range of controllers (from very simple to very complex) to make use of its features. In addition, the present invention includes support for status reporting and notification mechanisms so that controllers are aware of what is occurring within the device, thus keeping the user informed.

The model of the present invention supports the concept of media collections, which could be removable cartridges holding some number of discs or tapes, or any other storage item, such as PCMCIA cards that store audio or video data. These collections may be identified and independently manipulated. Thus, it is possible to have a very large number of discs, tapes, etc. in a media library and to be able to access them (the number of slots in the media changer is not a limitation to the number of discs or tapes that could be supported).

The model of the present invention supports any number of drives from a single media changer; thus, the changer can select a piece of media and position it in any "load position" for installation in a drive. The number of load positions, and hence the number of drives that can be supported, is limited only by the particular implementation.

Further, the model of the present invention is defined by a technical specification in which the implementation is left to the product manufacturer. The specification defines several data structures for media type description (how to describe a CD, a DVD disc, etc.), for the contents of the media (titles for each track on a disc, the duration of each track, etc.), and for status reporting and notification. These data structures could be modified in any number of ways to include or exclude various pieces of information which may or may not be available depending on the media and the capabilities built into the media changer subunit.

BRIEF DESCRIPTION OF THE DRAWINGS

The present invention is illustrated by way of example and not by way of limitation, in the figures of the accompanying drawings and in which like reference numerals refer to similar elements and in which:

FIG. 3 shows a table illustrating the general subunit identifier structure of the present invention.

FIG. 4 shows a table illustrating the subunit_dependent_ information field for a media changer subunit model of the present invention.

FIG. 5 shows a table illustrating the specifications of the various media types in accordance with one embodiment of the present invention.

FIG. 6 shows a table illustrating the currently defined form factors of the present invention.

FIG. 7 shows a table illustrating the object lists defined by the media changer subunit model of the present invention.

FIG. 8 shows a table illustrating the general AV/C slot list data structure of the present invention.

FIG. 9 shows a table illustrating the attributes that are defined for both object lists and object entries in accordance with one embodiment of the present invention.

FIG. 10 shows a table illustrating the general AV/C object descriptor structure.

FIG. 11 shows a table illustrating the slot_list_specific_ information field from the table of FIG. 8.

FIG. 12 shows a table illustrating the last_update field in accordance with one embodiment of the present invention.

FIG. 13 shows a table illustrating the format of the empty_slots field in accordance with one embodiment of the present invention.

FIG. 14 shows a table illustrating the entry_specific_ information field in the slot object list descriptor in accordance with one embodiment of the present invention.

FIG. 15 shows a table illustrating the flag definitions in accordance with one embodiment of the present invention.

FIG. 16 shows a table illustrating the disc media definitions in accordance with one embodiment of the present invention.

FIG. 17 shows a table illustrating the media changer subunit model commands of the present invention.

FIG. 18 shows a table illustrating the IMPORT MEDIA command of the present invention of FIG. 17.

FIG. 19 shows a table illustrating the various response types of the response status of the present invention.

FIG. 20 shows a table illustrating the EXPORT MEDIA control command from the table of FIG. 17.

FIG. 21 shows a table illustrating the LOAD MEDIA control command from the table of FIG. 17.

FIG. 22 shows a table illustrating the UNLOAD MEDIA control command from the table of FIG. 17.

DETAILED DESCRIPTION OF THE INVENTION

Figure 1A:
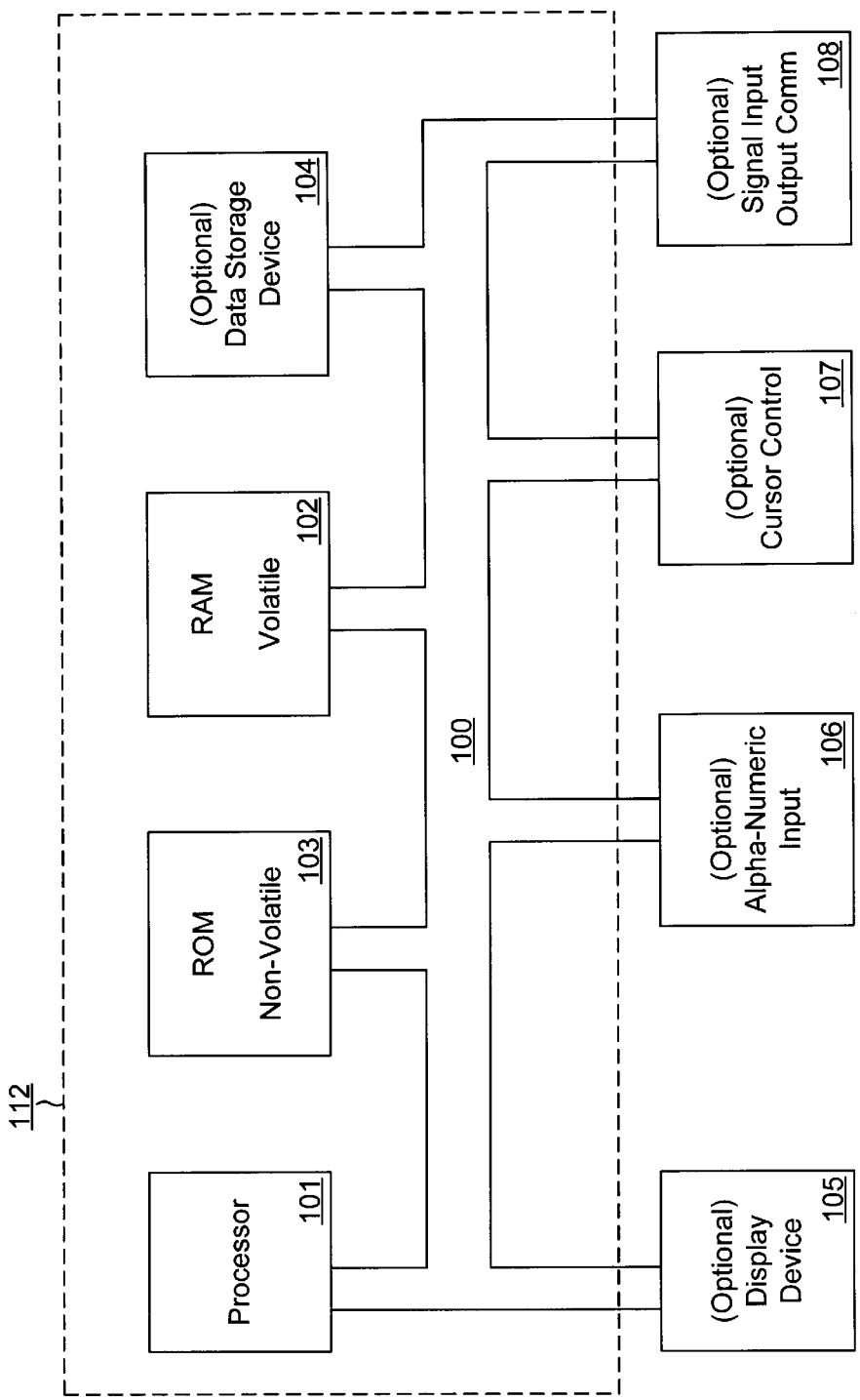
FIG. 1A shows a computer system environment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a model which is media type independent and thereby supports any type of media (CD's, MiniDiscs, DVCR video tapes, DAT Tapes, 8 mm tapes, etc.) in any combination (a changer may have CD and DVD discs installed, etc.). The model of the present invention supports enhancements to the AV/C protocol for content navigation and selection, providing both a detailed and a general abstraction of content discovery and description, and allowing for a range of controllers (from very simple to very complex) to make use of its features. In addition, the present invention includes support for status reporting and notification mechanisms so that controllers are aware of what is occurring within the device, thus keeping the user informed.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

Computer System Environment

Referring to FIG. 1A, a computer system 112 is illustrated. Within the following discussions of the present invention, certain processes and steps are discussed that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail as follows.

In general, computer system 112 used by the present invention comprises an address/data bus 100 for communicating information, one or more central processors 101 coupled with bus 100 for processing information and instructions, a computer readable volatile memory unit 102 (e.g., random access memory, static RAM, dynamic RAM, etc.) coupled with bus 100 for storing information and instructions for central processor(s) 101, a computer readable non-volatile memory unit (e.g., read only memory, programmable ROM, flash memory, EPROM, EEPROM, etc.) coupled with bus 100 for storing static information and instructions for central processor(s) 101. System 112 can optionally include a mass storage computer readable data storage device 104, such as a magnetic or optical disk and disk drive coupled with bus 100, for storing information and instructions. Optionally, system 112 can also include a display device 105 coupled to bus 100 for displaying information to the computer user, an alphanumeric input device 106 including alphanumeric and function keys coupled to bus 100 for communicating information and command selections to central processor(s) 101, a cursor control device 107 coupled to the bus for communicating user input information and command selections to central processor(s) 101, and a signal input/output device 108 coupled to bus 100 for communicating messages, command selections, data, etc. to and from central processor(s) 101.

Figure 1B:
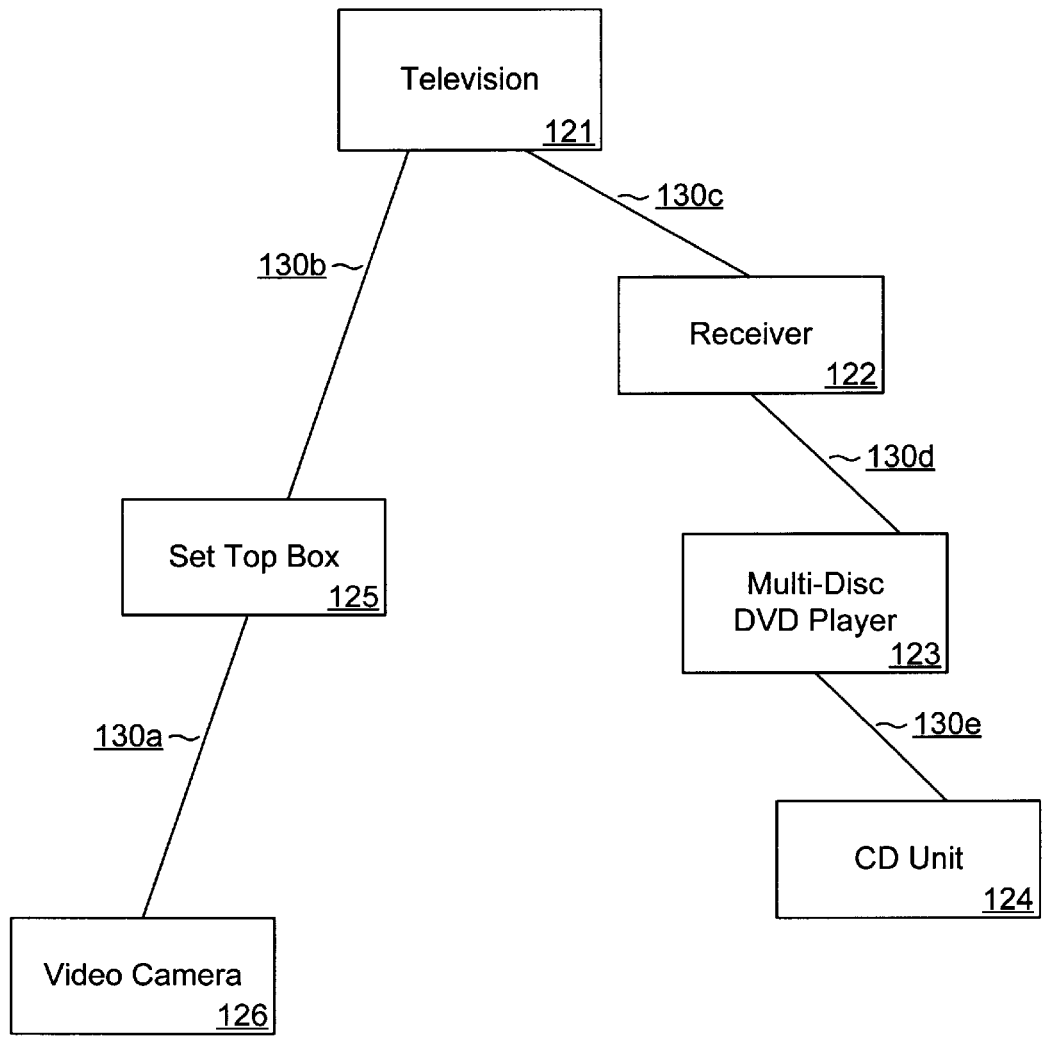
FIG. 1B shows a home audio visual network in accordance with one embodiment of the present invention.

With reference now to FIG. 1B, a home AV network 120 in accordance with one embodiment of the present invention is shown. Network 120 includes 6 devices: a television 121, a receiver 122, a multi-disc DVD player 123, a CD unit 124, a set top box 125, and a video camera 126. Each of the devices 121–126 is communicatively coupled via respective IEEE 1394 bus links 130a through 130e to form a single network, wherein each device on the network can communicate with any other device on the network (e.g., in accordance with well known IEEE 1394 bus protocols). While network 120 is shown including 6 devices, it is understood that network 120 is suited to include any number of devices, up to the limits of the particular bus technology.

The IEEE 1394 serial bus used by network 120 of FIG. 1 is a high-speed bus architecture for interconnecting digital devices thereby providing a universal input/output connection. The IEEE 1394 standard defines a digital interface for the applications thereby eliminating the need for an application to covert digital data to analog data before it is transmitted across the bus. Correspondingly, a receiving application receives digital data from the bus, not analog data, and therefore is not required to covert analog data to digital data. The cable required by the IEEE 1394 standard is very thin in size compared to other bulkier cables used to connect such devices. Devices can be added and removed from an IEEE 1394 bus while the bus is active. If a device is so added or removed, the bus automatically reconfigures itself for transmitting data between the then existing nodes. A node is considered a logical entity having a unique address on the bus structure. Each node provides an identification ROM, a standardized set of control registers and its own address space.

The IEEE 1394 communication standard of network 120 of FIG. 1B supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of an application for the transfer of data isochronously is from a set top box 125 to a television 121. The set top box 125 receives the video stream from a cable company and divides the stream into discrete packets. The set top box 125 then transfers each packet, representing the images and sounds recorded over a limited time period, during that time period, for display by the television 121. The IEEE 1394 standard bus architecture provides multiple channels for isochronous data transfers between applications. Specifically, a six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

It should be appreciated that the present invention is equally well suited for home audio visual networks based upon other well known network or bus standards besindes IEEE 1394. Such standards include, for example, ethernet, universal serial bus, token ring, and the like. Accordingly, the IEEE 1394 structure of network 120 is shown and described herein as an example bus architecture only.

As described above, the present invention provides a software data structure which abstracts the functionality of a device on the network and provides a standardized method and system for interacting with the device and for controlling, using, invoking, etc., the functionality of the device. Particularly, the present invention provides a standardized data structure for interacting with disc-based media changers (e.g., Multi-disc DVD player 123) and other such media changers. This data structure is referred to herein as a "model." As its name implies, a model in accordance with the present invention abstracts the features and functionality of a device, thereby providing a means of interacting with the device which is media type independent and which is compatible with a wide range of "controller devices," such as, for example, receiver 122 or set top box 125. The device model of the present invention is instantiated within a computer system which is typically embedded within the device itself. A Multi-disc DVD player 123 and its embedded computer system 112 are described in FIG. 1C below.

Figure 1C:
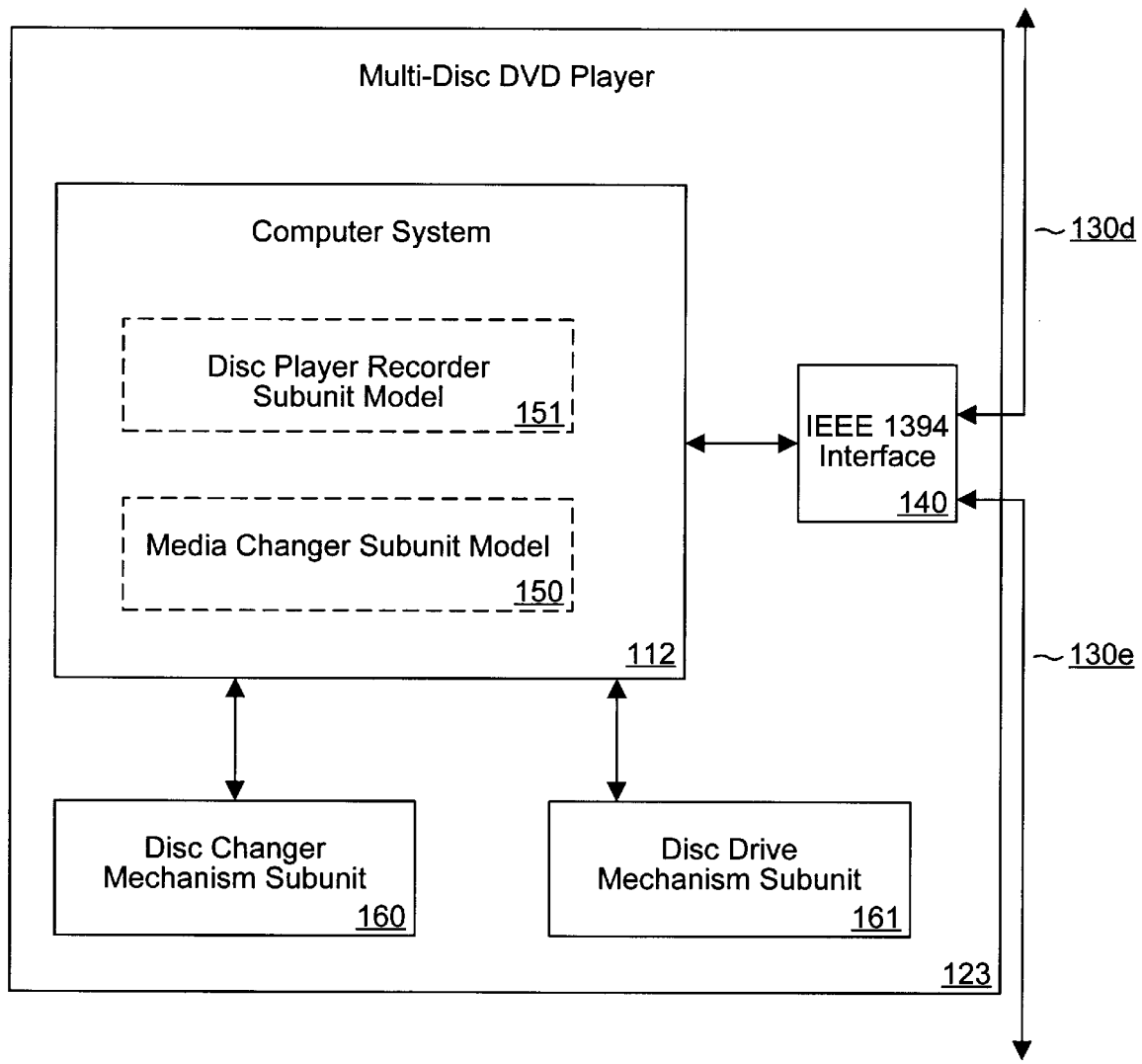
FIG. 1C shows a multi-disc DVD player in accordance with one embodiment of the present invention.

FIG. 1C shows a multi-disc DVD player 123 in accordance with one embodiment of the present invention. As described above, multi-disc DVD player 123 includes computer system 112 embedded within its internal electronics. Instantiated within computer system 112 is a media changer subunit model 150 in accordance with one embodiment of the present invention and a disc player recorder subunit model 151. Together, models 150 and 151 embody the functionality and features of multi-disc player 123. The multi-disc DVD player 123 also includes a disc changer mechanism subunit 160 and a disc drive mechanism subunit 161.

Media changer subunit model 150 provides an abstraction of the functionality and features of the disc changer mechanism 160 specifically. Via computer system 112, the functions, status, etc. of disc changer mechanism 160 are accessed and controlled by other software modules and controllers within network 120. Other devices on network 120 interact with disc changer mechanism 160 by interacting with media changer subunit model 150. An IEEE 1394 interface 140 provides a communications link to the network 120 via link 130d and 130e.

The media changer subunit model 150 supports enhancements to the well known AV/C protocol for content navigation and selection, providing both a detailed and a general abstraction of content discovery and description, and allowing for a range of controllers (from very simple to very complex) to make use of its features. Media changer subunit model 150 supports status reporting and notification mechanisms so that other controllers (e.g., set top box 125) are aware of what is occurring within the device, thus keeping the user informed. This is especially important in a distributed network environment where, for example, the controlling set top box 125 may be in another room of the house.

The Media changer subunit model 150 supports the concept of media collections, which could be removable cartridges holding some number of discs or tapes, or any other type of removable media (e.g., game cartridges, etc.). These collections may be identified and independently manipulated. Thus, it is possible to have a very large number of discs, tapes, etc. in a media library and to be able to access them (the number of slots in the media changer is not a limitation to the number of discs or tapes that could be supported).

The media changer subunit model 150 is defined by a technical specification in which the specific implementation is left to the product manufacturer. The media changer subunit model specification of the present invention defines several data structures for media type description (how to describe a compact disc, a DVD disc, etc.) the contents of the media (titles for each track on a disc, the duration of each track, etc.), and for status reporting and notification. These data structures could be modified in any number of ways to include or exclude various pieces of information which may or may not be available depending on the media and the capabilities built into the media changer subunit.

The software data structure of a typical media changer subunit model of the present invention (e.g., media changer subunit model 150) and one embodiment of a disc changer mechanism subunit (e.g., disc changer mechanism subunit 160) are described below.

Media changer subunit model overview

In a typical application, a media changer subunit model of the present invention is used to implement an AV/C media changer subunit model. As described above, an AV/C media changer subunit model in accordance with the present embodiment is a stand-alone piece of functionality separate from any specific type of media playing mechanism (e.g., disc changer mechanism 160). The AV/C media changer subunit model supports various types of media and is not limited to only disk media.

It should be appreciated that the model and data structures used for the AV/C media changer subunit model are consistent with those proposed for the AV/C tuner subunit. The general descriptor structures and commands (e.g., OPEN DESCRIPTOR, READ DESCRIPTOR, WRITE DESCRIPTOR, OBJECT NUMBER SELECT commands and subunit identifier, objects and object lists) are described in the AV/C 3.0 specification. An understanding of the general AV/C enhancements described above is helpful in understanding the AV/C media changer subunit proposal, and as such, the AV/C 3.0 specification is incorporated herein by reference as background material. Therefore, that information is not generally repeated here. As such, only the AV/C media changer subunit model-specific model, structures, commands and implementation profiles are primarily described.

As described herein below, it should be understood that the term "media changer subunit" refers to a media changer subunit mechanism, such as disc changer subunit 160 of FIG. 1C.

The structure of the media changer subunit model of the present invention

A media changer subunit provides a storage area for one or more drives. Multiple pieces of media are stored in a media changer subunit, and there may be different types of media supported by a changer. As referred to herein, the term media refers to an individual piece of recorded media, such as a CD, MD, or video tape. Media may be individually selected by a controller and moved to a drive for access to the media content. The media changer of the present invention has multiple spaces called slots in its storage area, and each slot can hold one piece of media. When a piece of media is stored in a media changer subunit it has an assigned slot. It is moved from its assigned slot to a drive, and when returned it should go back to the same slot.

The ability to place a piece of media in a drive means that the changer has a certain "load position" that it moves to for the loading/unloading operation. A changer that can handle loading and unloading multiple drives will have multiple load positions, one for each drive.

A media changer may support multiple collections of media, and each collection may be individually identifiable. Such collections are typically represented by multi-disc container such as a cartridge mechanism, in which several items are placed. The cartridge has "spaces" for the installation of media; each of these spaces will correspond to a slot in the media changer subunit when the cartridge is installed. It may be possible to have several cartridges installed in a single changer. An exemplary embodiment of a cartridge-based media changer is shown below.

Figure 2A:
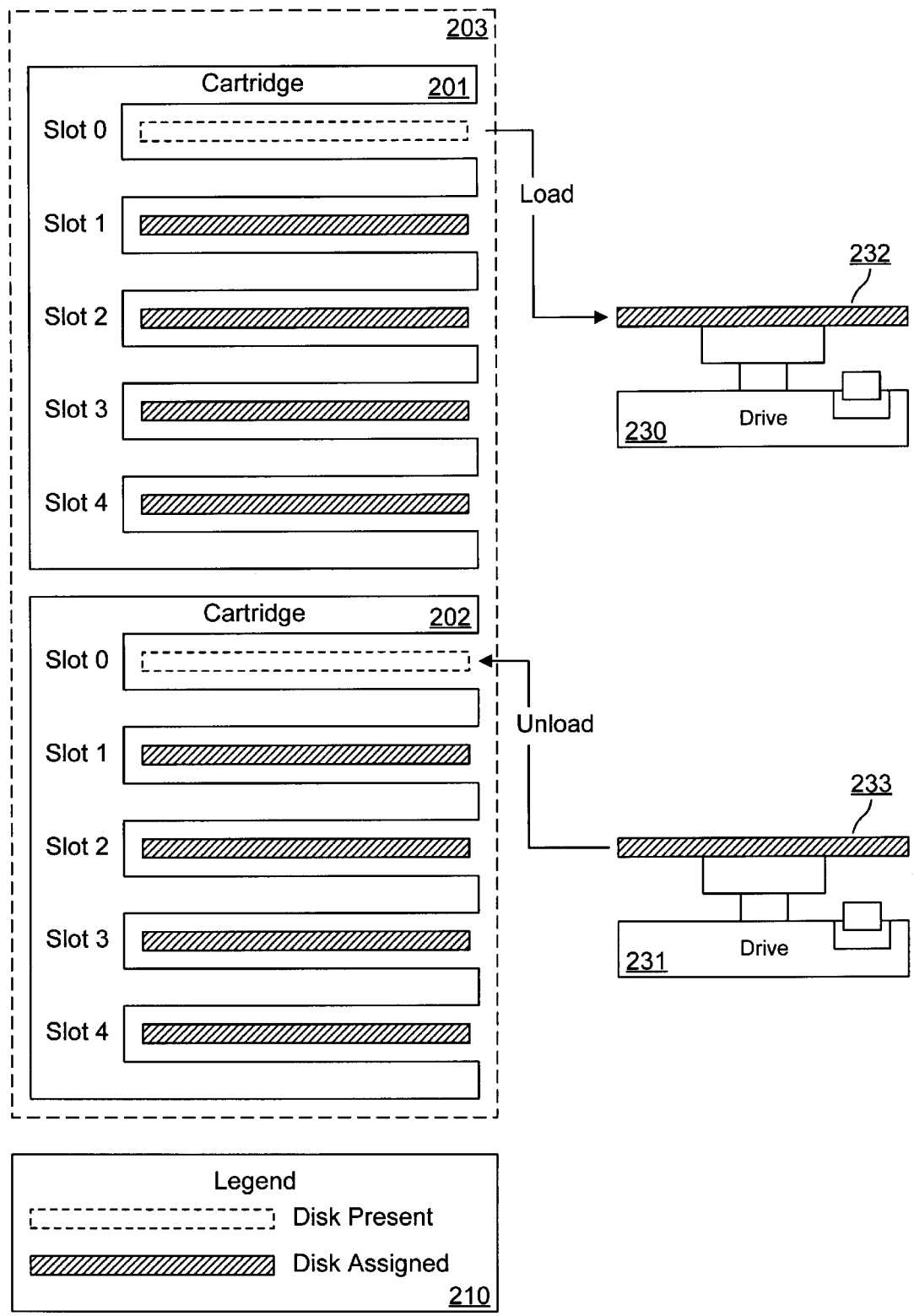
FIG. 2A shows a diagram illustrating the relationship between a media changer subunit and the drives it supports.

Referring now to FIG. 2A, a diagram 200 which illustrates the relationship of a media changer subunit to the drives that it supports, how its storage area is defined, supporting multiple collections, and the media slot assignment rules, is shown. As shown in diagram 200, a first cartridge 201 and a second cartridge 202 are contained within a media storage assembly 203. Cartridges 201 and 202 both have a plurality of slots (e.g., slot 0 through slot 4) which store media, which in the present embodiment are discs. Diagram 200 also shows a legend 210 which illustrates the appearance of disks when present in a slot and disks when not present in a slot but wherein the slot is assigned (e.g., such as when the disc to which the slot is assigned is currently loaded on a drive).

Diagram 200 also shows a first drive 230 and a second drive 231 for "playing" the discs. As depicted, drives 230 and 231 both have discs mounted, disc 232 and disc 233 respectively. Line 250 shows the load path from which disc 232 was loaded onto drive 230 from slot 0 of cartridge 201. Line 251 shows the unload path to which disc 233 will be unloaded from drive 231 back into slot 0 of cartridge 202.

Figure 2B:
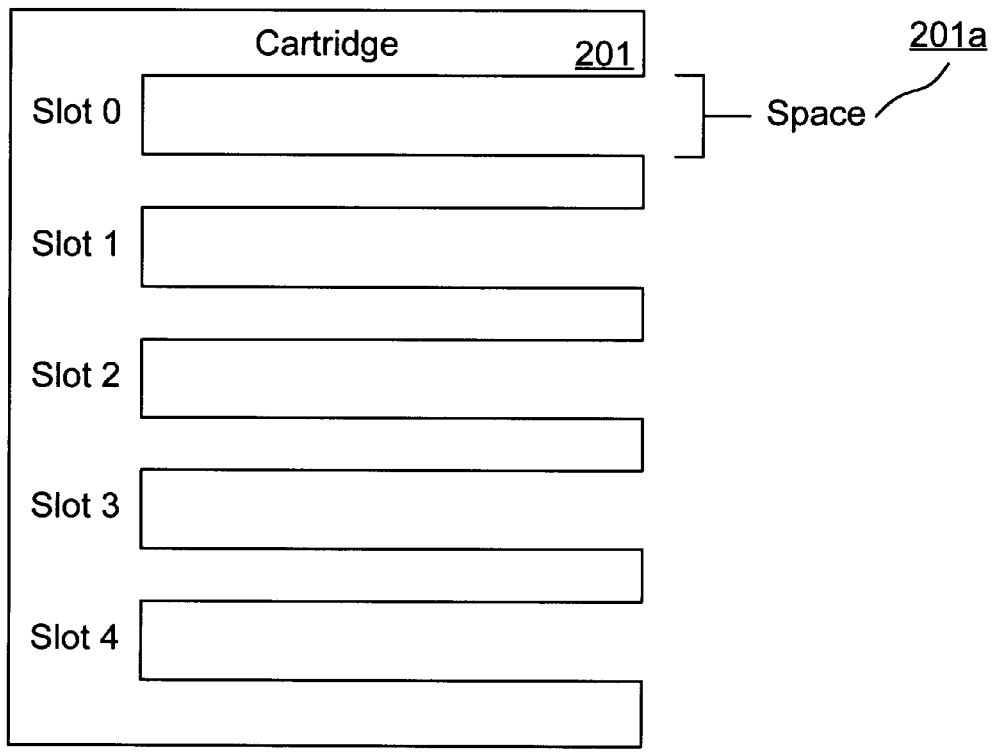
FIG. 2B shows a cartridge from FIG. 2A with no discs stored in its slots.

FIG. 2B shows cartridge 201 from FIG. 2A with no discs stored in its slots. As described above, cartridge 201 of the present embodiment includes five slots, numbered slot 0 through slot 4. Each of the slots, such as for example, slot 0, is essentially a storage location or space for storing media, which in this case are discs. This is shown by line 201a. It should be appreciated that the present invention is not limited to functioning with cartridge-type multi-disc containers. Other types of containers, such as carousel type multi-disc containers, can be used. Additionally, the present invention is not limited to use with only two cartridges, as shown in FIG. 2A. Any number of cartridges may be supported within a media changer of the present invention. Further, each of these cartridges may include any number of slots for storing media.

Figure 2C:
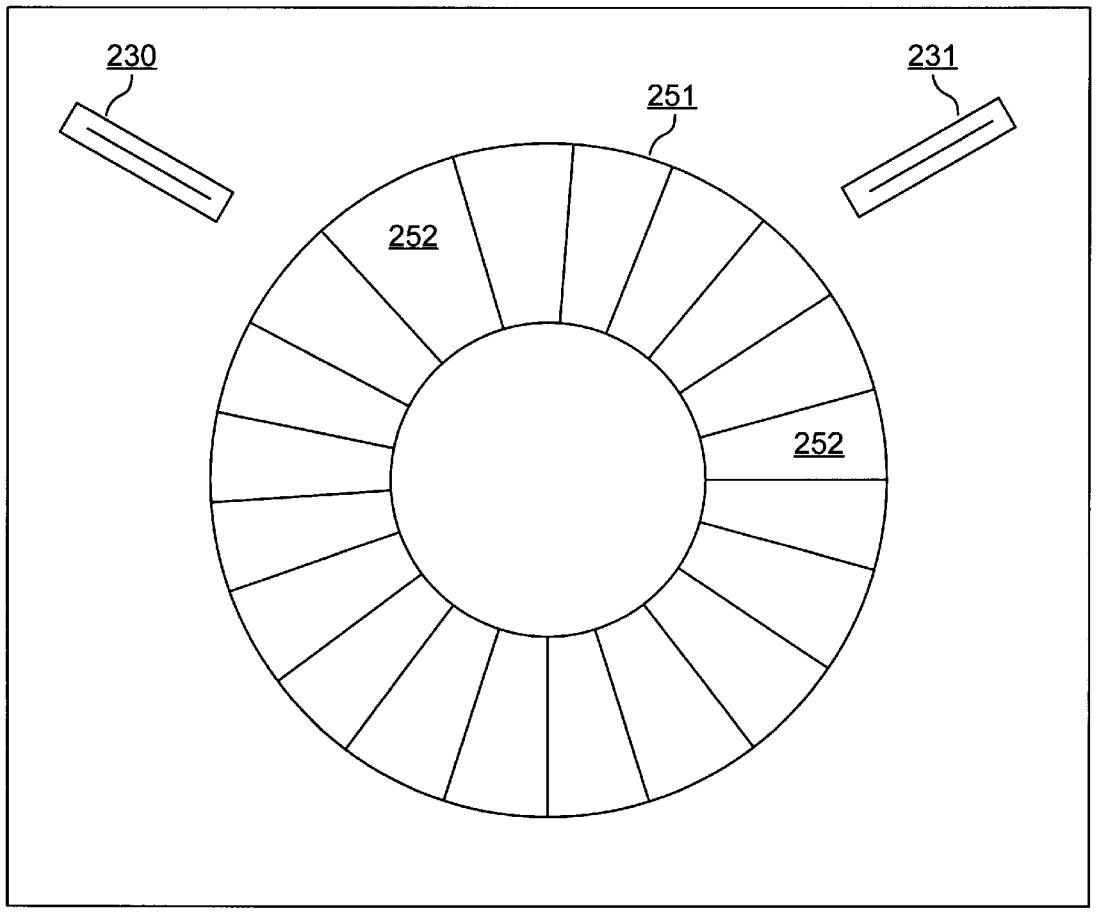
FIG. 2C shows a carousel based media changer subunit in accordance with one embodiment of the present invention.

FIG. 2C shows a carousel based media changer subunit 250 in accordance with one embodiment of the present invention. The carousel-based media changer subunit 250 is substantially similar to the cartridge-based media changer subunit depicted in FIG. 2A, however, as opposed to using cartridges to store the discs, a carousel 251 is used. Carousel 251, in a manner similar to the cartridges (e.g., cartridge 201 of FIG. 2B), includes a number of slots 252 for storing the discs. The carousel-based approach is advantageous due to the fact that, in typical implementations, carousel 251 can store many more discs (e.g., 200 or more).

Media changer subunit model identifier descriptor

Referring now to FIG. 3, a table 300 of the general subunit identifier descriptor structure of the present invention is shown. Persons interested in a more comprehensive description of this structure and the meaning of the fields other than the subunit_dependent_information field, are referred to the general AV/C specification document. The manufacturer_dependent_length and manufacturer_dependent_information fields are used for vendor-specific data. The format and contents are defined by the media changer subunit manufacturer. The subunit_dependent_information field of table 300 is further described below.

Referring now to FIG. 4, a table 400 of the subunit_dependent_information for a media changer subunit model of the present invention is shown. It should be noted that the subunit_dependent_information_attributes field is reserved for future definition. The media_capacity field indicates how many pieces of media this subunit can store. This value is the same as the number of slots in the changer. The number_of_load_positions field shows how many drives this subunit can handle. The load_position[x] fields contain the unique ID for each of the drives (or load positions). When the media changer subunit and the drives are contained within the same unit, the load_position value (s) should be the address {subunit_type, subunit_ID} of the drives.

It should be noted that the subunit address may be any number of bytes in length, depending on whether it uses the extended addressing mechanism or not. Details are presented in the AV/C specification document. The subunit_type should be in the most significant bytes and the subunit_ID should be in the least significant bytes of this field. When the changer has load positions which go to external locations, the load_position value assignments are implementation dependent.

The number_of_supported_physical_media_types field shows how many physical media sizes this subunit can support. The physical_media_types[x] fields are an array of supported (as opposed to installed) physical media specifications which describe the physical characteristics of the media. The physical_media_types[x] fields of table 400 are further described below.

FIG. 5 shows a table 500 which lists the specifications of the various media types. In accordance with one embodiment of the present invention, each of the physical media type specifications (e.g., the physical_media_types[x] fields) has the general format as shown in table 500.

It should be noted that certain slots within a changer of the present invention may only support a subset of the physical media types that are supported by the entire changer. For this reason, each slot object descriptor contains a collection of the indexes of the physical_media_type[x] fields that represent the physical media types supported in that slot. For more details, please refer to the section titled "Slot Object entry_specific_information," which is described below.

In accordance with the present invention, the specification_length field indicates the total number of bytes for the entire media type descriptor, including the type dependent part.

The physical_media_type field identifies the physical form factor of the media that this subunit can handle. The type_dependent_length field contains the number of bytes used by the type_dependent_information field. The type_dependent_information field contains information that is specific to each type of media supported by the subunit. At present there is no type dependent information defined for the currently-defined media types. The physical_media_type field of table 500 is further described below.

FIG. 6 shows a table 600 which shows the currently-defined form factors of the present invention. As shown in table 600, various physical media types are defined and categorized in accordance with their respective form factors.

Media Changer Status Descriptor

The media changer status descriptor data structure provides information about the current status of the media changer subunit. The media changer subunit may be in different states depending on what it is currently doing, such as, for example, moving the mechanism to select a piece of media, idle, error state—possibly because of a physical obstruction—or the like. In accordance with the present invention, controllers may examine the status descriptor and may request notification for state changes using the CHANGER STATUS command.

Media Changer Objects & Object Lists

Referring now to FIG. 7, a table 700 of the object lists defined by the media changer subunit model of the present invention is shown.

The objects in the slot list (the slot objects) shown in table 700 may have child lists, depending on the capability of the changer to support these lists. The child lists represent the contents of the media in the slot. The objects in a contents list will represent either audio or video tracks (or segments). In order to build the contents lists, the media changer subunit model will have to work with the appropriate drive subunit to get the contents descriptions. It should be noted that while the drives can read the media in the present embodiment, the changer cannot. For details on audio or video tracks, please refer to the well known AV/C DISC subunit definition. In addition, for more detailed information regarding objects and object lists, readers are referred to US patent application "METHOD AND APPARATUS FOR REPRESENTING DEVICES AND AVAILABLE INFORMATION WITHIN A NETWORK OF DEVICES USING OBJECT LISTS AND OBJECT ENTRIES" filed on Mar. 17, 1998, which is incorporated herein by reference.

FIG. 8 shows a table 800 of the general AV/C slot list data structure. Table 800 shows the general AV/C slot list data structure. Those desiring the full description of the general list contents and usage requirements are referred to the well known AV/C specification. It should be noted that the list_specific_information field exists only if specified in the attributes field. The attributes field of table 800 is further described by table 900 below.

With reference now to FIG. 9, a table 900 illustrating the attributes that are defined for both object lists and object entries is shown. It should be noted that some of the attributes shown in table 900 are common to more than one kind of descriptor, while others are unique to one type or another (e.g., as noted in the description of the attribute). For example, the has_child_ID attribute and the has_object_ID attribute are valid only for the object entry descriptor and the object list descriptor, respectively.

Referring now to FIG. 10, a table 1000 illustrating the general AV/C object descriptor structure is shown. It should be noted that the child_list_ID, object_ID and entry_specific_information fields exist only if specified in the attributes field. Objects are unique based on their entry_type and entry_specific_information fields. The contents of the list_specific_information field for each of the media changer subunit model object are discussed below, along with the definition of the corresponding objects for those lists.

Slot list and slot objects

The slot list contains information about the collection of media in the slots of the media changer subunit. There are no assumptions or requirements made about the type of media contained in a changer. Thus, for example, each slot could hold a different type of media.

Accordingly, one of the most significant attributes of the slot list is the fact that it does not contain any information that is derived from the media contents. All information within the slot list and slot objects is derived by the media changer subunit model or is provided by the user.

FIG. 11 shows a table 1100 illustrating the slot_list_specific_information field from table 800 of FIG. 8. As shown in table 1100, the list_specific_information_length field specifies the number of bytes used for the list_specific_information field. The attributes_of_slot_list_specific_information field is reserved for future definition. The last_update field indicates the time stamp when this list was last modified. If the most significant bit of the last_update field is set to one, the last_update value contains a 27-bit counter which is incremented on each modification of the object list (the LSB of this counter is at address offset $03_{16}$). If the msb is zero, the last_update field contains a time stamp. This field is shown in greater detail in table 1200 below.

Referring still to table 1100 of FIG. 11, the empty_slots field is a bit mask indicating whether the slot associated with each bit contains a piece of media or not. A bit set to 1 means there is media in the slot. The controller may examine this field to determine quickly which slots are populated or not. This allows the controller to examine efficiently the slot list structure and not bother reading empty slot entries. The empty_slots field is shown in greater detail in table 1300 below.

The slot_list_ID field contains the ID value of this slot list. This field may be used to assign a unique ID to various collections of media, where a collection could be in a removable cartridge. Each cartridge could be assigned an ID value to assist with the identification of individual pieces of media within a given collection.

The slot_list_name_length field contains the number of bytes used by the slot_list_name field. The slot_list_name field contains the name of the slot list, which would normally be assigned by the user. The contents of this field should be printable English ASCII text as defined in the IEEE 1212 standard, section 8.1.4 of the 1994-10-05 edition. Each text character is one byte.

FIG. 12 shows a table 1200 illustrating the last_update field. As described above, the last_update field indicates the time stamp when this list was last modified. The year bit of table 1200 is 1 when the year is odd and 0 when the year is even. This allows the time stamp mechanism to cover a two-year period. The reader of the time stamp can examine the year bit and the current calendar year (e.g., which is presumed to be available elsewhere) to determine if the time stamp represents a change in the current or previous year.

Referring now to FIG. 13, a table 1300 illustrating the format of the empty_slots field is shown. As described above, the empty_slots field of table 1100 is a bit mask indicating whether the slot associated with each bit contains a piece of media or not.

The value N is the number of slots, the value of which can be found in the number_of_slots field of the slot list descriptor. The size, in bytes, of the empty_slots field will, therefore, be determined by the capacity of the media changer subunit. The remaining bits which do not represent valid slots should be set to 0.

It should be noted that the empty_slots field indicates which slots have been assigned a piece of media, but it does not tell whether the assigned media currently occupies the slot or is in a drive. Slots which have a piece of media assigned to them may currently be empty because the media is in a drive. In this case, the slot is not available to receive a different piece of media. The entry_specific_attributes field of the appropriate slot[x] descriptor determines if a slot is occupied or not.

Slot Object entry specific information

Referring now to FIG. 14, a table 1400 illustrating the entry_specific_information field in the slot object list descriptor is shown. In accordance with the present invention, the number_of_slots field in the slot object list descriptor contains the number of slots in the changer. It also represents the number of objects in the slot list because, in accordance with one embodiment of the present invention, there is only one slot object for each slot. The slot[x] fields each represent a slot.

Referring still to table 1400 of FIG. 14, the entry_specific_information_size field indicates the number of bytes used for the entry_specific_information field. The entry_specific_attributes field contains a set of bit flags which describes this entry. The flags are described in greater detail in table 1500 below.

If the present attribute is zero, then the changer should set the format_valid attribute bit to zero also. The installed_media_format field defines the format of the information on the piece of media installed in the slot. This information must be obtained from a drive subunit, because the media changer subunit does not have the ability to read the media. If the format_valid attribute bit is clear, this field should be ignored by the controller. The values defined for installed_media_format depend on the type of media. The disc media definitions of the present invention are defined in table 1600 below.

The installed_physical_media_type field is the index of a physical_media_type[x] descriptor, as defined in the media changer subunit model identifier descriptor, which begins on page 6. If no media is present in this slot, then the value in this field should be ignored by a controller.

The number_of_supported_physical_media_types field contains the number of different physical media sizes that can be supported by this slot. The supported_physical_media_type[x] fields are indexes of physical_media_type[x] descriptors, as defined above for the installed_physical_media_type field. The load-position is the ID of the load position to which the media was loaded. While the media is present in the slot the value in the load_position field should be ignored by a controller.

FIG. 15 shows a table 1500 depicting the flag definitions in accordance with one embodiment of the present invention. As described above, the entry_specific_attributes field of table 1400 contains a set of bit flags which describes this entry. Table 1500 shows the meaning of these flags.

FIG. 16 shows a table 1600 illustrating the disc media definitions in accordance with one embodiment of the present invention. As described above, the values defined for installed_media_format field of table 1400 depend on the type of media, as shown in table 1600. For example, a DVD movie disc would have the value $0501_{16}$.

Contents lists and content objects

Contents lists of the present invention are child lists of the slot objects. Each slot object represents a piece of media (if one is installed in the slot). The child lists of the media represent the contents of that media.

In accordance with one embodiment of the present invention, the media changer subunit model does not have specific knowledge of content descriptions. It gets the information for content descriptions from the drive subunit which supports the media in the slot. For detailed descriptions of the contents description structures, please refer to the appropriate specification (disc or VCR subunit).

Each drive subunit will define its own data structures for content description, and the appropriate object lists and list_type values. Because the subunits define these structures independently, it is possible that two different types of subunits will define the same list_type value for lists with very different contents. Because the media changer subunit model gets its content lists from different drives, it is possible that the list_type values for the lists maintained by the changer could conflict with each other.

The controller must examine the slot object descriptor installed_media_format field to determine the format and definition of the contents list hierarchy that descends from a slot object.

Preset Lists and Preset Objects

In accordance with the present invention, it should be appreciated that the changer subunit may support any number of user preset lists. Each entry in the preset list specifies enough information to allow the selection of any track or segment on any piece of media. The specification accounts for removable cartridges, so that the preset may refer to any item in an AV library even if it does not happen to be currently installed in the changer (of course, the user will have to install the item in order to select from it).

Media changer subunit model commands

Referring now to FIG. 17, a table 1700 of media changer subunit model commands is shown. Each of the commands shown in table 1700 represent basic commands for controlling the media changer subunit (e.g., import media, export media, load media, and unload media). Each of the commands is described separately in the tables below.

FIG. 18 shows a table 1800 illustrating the IMPORT MEDIA command. The IMPORT MEDIA control command is used to put a piece of media into a media changer subunit. If the changer supports cartridges, then the IMPORT MEDIA command will affect the cartridge which contains that slot.

The slot_number field specifies which slot should receive the new piece of media. If there is a media already assigned to this slot, the command should be REJECTED. In order to change the media assignment of a slot, it is necessary first to EXPORT the currently assigned media and then IMPORT the new media.

If there is a removable cartridge inserted in the media changer subunit which contains this slot, then the cartridge should be ejected so that the user can install the new media if the slot is free to receive a piece of media. If the cartridge has one or more of its media from other spaces installed in a drive, then the media changer subunit may REJECT the command or it may ACCEPT the command.

Referring still to table 1800 of FIG. 18, if the subunit accepts the command, then it should be aware of the following: It is possible that the cartridge has a piece of media assigned to each of its spaces, but one or more of those items was installed in a drive. When the cartridge is ejected, there may be several spaces open that can receive a piece of media. If the user installs a new media into a space which corresponds to a slot with a piece of media assigned and then re-inserts the cartridge, the cartridge should be ejected and the command should be REJECTED.

If cartridge ejection is a manual operation requiring user action, then the rules regarding command acceptance or rejection should still be followed.

The status field should be set to $FF_{16}$ on input. In the response frame (either ACCEPTED or REJECTED), this field should be updated with the appropriate status response. These status responses are defined in table 1900 below.

FIG. 19 shows a table 1900 the various response types of the response status. As described above, the returned status of table 1900 is returned according to the "ACCEPTED" or "REJECTED" responses.

Referring now to FIG. 20, a table 2000 illustrating the EXPORT MEDIA control command from table 1700 is shown. The EXPORT MEDIA control command is used to take a media out of a media changer subunit.

FIG. 21 shows a table 2100 illustrating the LOAD MEDIA control command from table 1700 above. The LOAD MEDIA control command is used to set the media from the slot to the drive.

FIG. 22 shows a table 2200 illustrating the UNLOAD MEDIA control command from table 1700 above. The UNLOAD MEDIA control command is used to return the media from the disc drive to its own slot.

Figure 23:
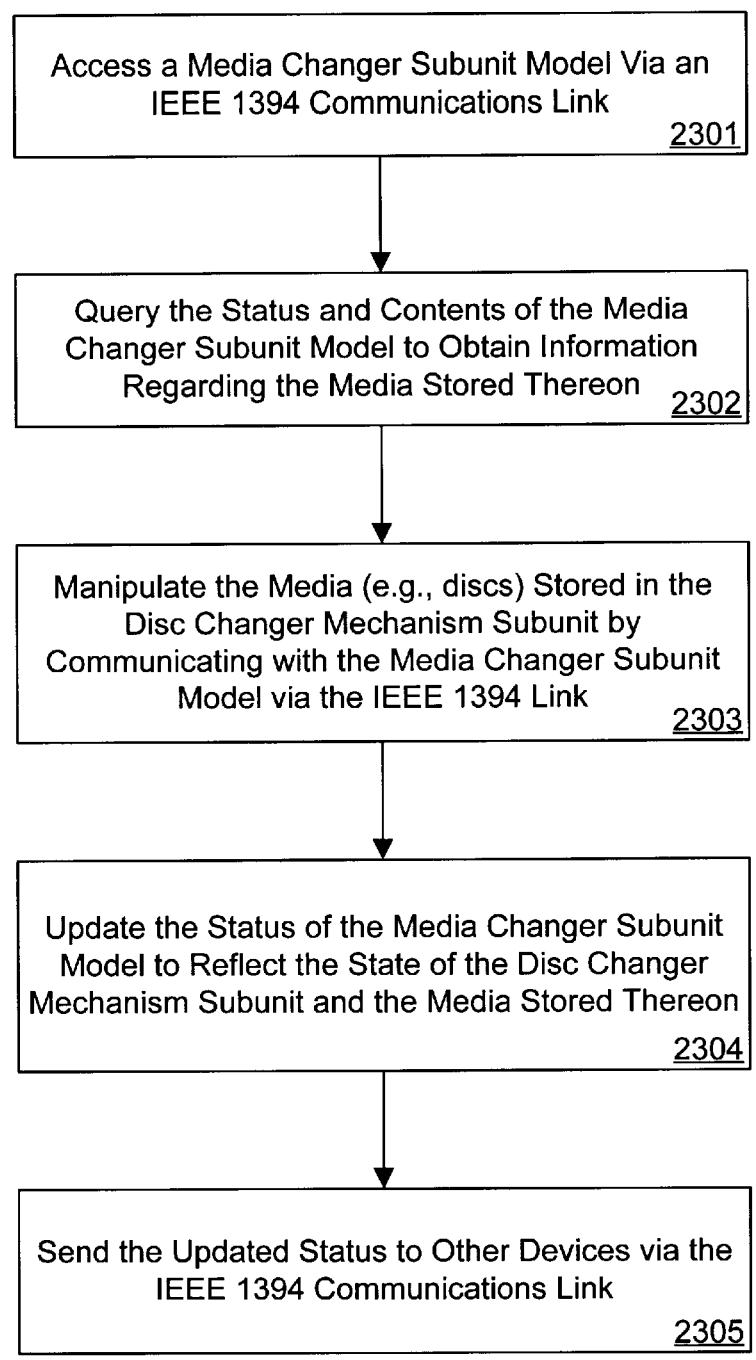
FIG. 23 shows a flow chart of the steps of an exemplary interface process between a media changer subunit and devices on a home audio visual network in accordance with one embodiment of the present invention.

Referring now to FIG. 23, a flow chart of the steps of a process 2300 in accordance with one embodiment of the present invention is shown. Process 2300 is an exemplary interface process between a media changer subunit and devices on a home AV network. The interface process is implemented via a media changer subunit model in accordance with one embodiment of the present invention (e.g., media changer subunit model 150 of FIG. 1C). The home AV network, as described above, is based on IEEE 1394 protocols.

Process 2300 begins in step 2301 where a media changer subunit model in accordance with the present invention is accessed via an IEEE 1394 communications link. As described above, a typical home AV network (e.g., network 120 of FIG. 1B) includes several AV devices coupled via IEEE 1394 communications links. The communications links allow the various devices to communicate, allowing them to exchange status information, commands, and the like. As described above, the media changer subunit model provides a software abstraction of the functionality and feature set of a media changer subunit (e.g., disc changer mechanism subunit 160 of FIG. 1C), thereby providing other devices on the network (e.g., controllers, etc.) with a standardized method of accessing and using the media changer subunit. The media changer subunit model is accessed via its IEEE 1394 communications link.

In step 2302, an external controller queries the status and contents of the media changer subunit model to obtain information regarding the media stored thereon. As described above, the media changer subunit includes means for storing numerous individual items of media, which in this embodiment happen to be discs (e.g., DVD discs, CDs, CD-ROMs, or the like). The media changer subunit model maintains several tables which catalog the status (e.g., titles, content, etc.) of the various discs stored within the disc changer mechanism subunit. This information is obtained by external devices by querying the media changer subunit model.

In step 2303, the particular external controller manipulates a selected disc stored in the disc changer mechanism subunit by communicating an appropriate command to media changer model via the IEEE 1394 communications link. Consequently, in step 2304, the status of the media changer subunit model is updated to reflect the new state of the disc changer mechanism subunit and the media (e.g., discs) stored thereon. Then, in step 2305, this updated status is sent to the particular external controller (e.g., set top box 125 of FIG. 1B, receiver 122, or the like) via the IEEE 1394 communications link by the media changer subunit.

Figure 24:
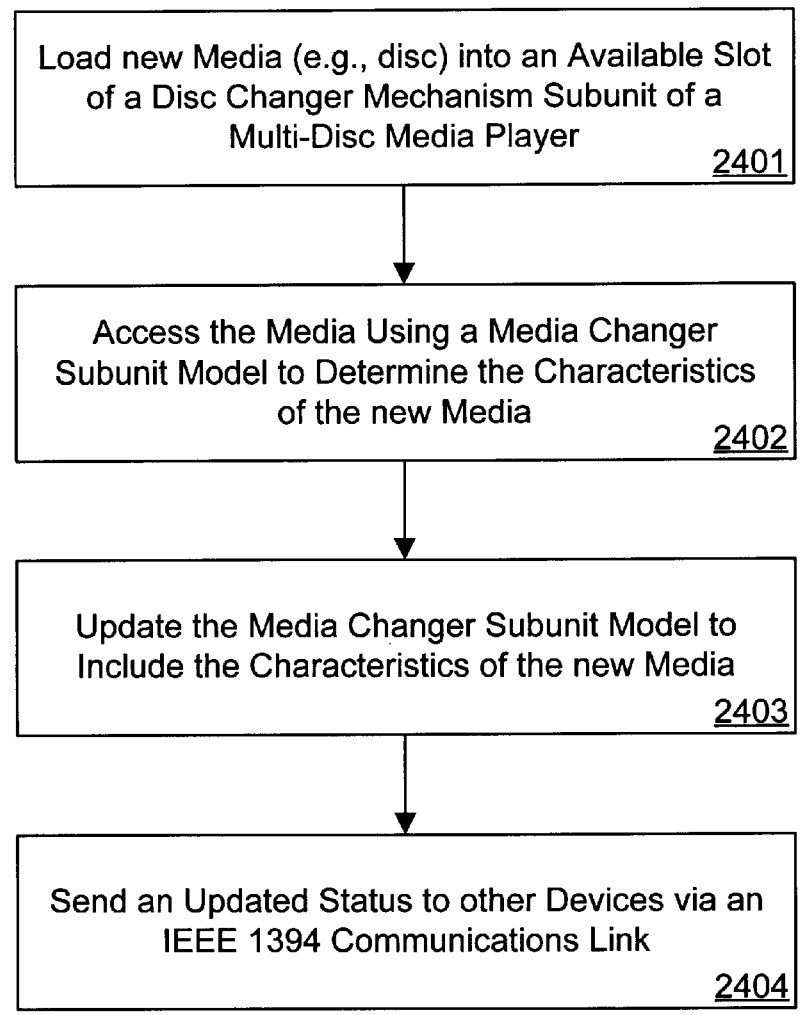
FIG. 24 shows a flow chart of the steps of a process of updating a media changer subunit model as new media is added to the disc changer mechanism subunit in accordance with one embodiment of the present invention.

With reference now to FIG. 24, a process 2400 in accordance with one embodiment of the present invention is shown. As with process 2300 of FIG. 23, process 2400 is an exemplary interface process between a media changer subunit and devices on an IEEE 1394 based home AV network. However, process 2400 depicts the steps involved in updating a media changer subunit model as new media is added to the disc changer mechanism subunit.

In step 2401, a user loads a new media item (e.g., a disc) into an available slot of the disc changer mechanism subunit of a multi-disc media player. In step 2402, the media (e.g., the disc) is accessed using a media changer subunit model to determine the characteristics of the new media item. As described above, the media changer subunit model interfaces with the disc player mechanism subunit to determine the characteristic of the new disc. Such characteristics include, for example, the title of the disc, the number of volumes on the disc, the titles of each of the volumes, and the like. In step 2403, as described above, the media changer subunit model updates itself to include the characteristics of the new media. In so doing, the media changer subunit model maintains the accuracy of its catalog of the various media items stored. Subsequently, in step 2404, the media changer subunit model sends an updated status to other interested devices (e.g., controller devices such as set top box 125). This updated status properly reflects the addition of the new media added by the user.

Thus, the present invention provides a model which is media type independent and thereby supports any type of media (CD's, MiniDiscs, DVCR video tapes, DAT Tapes, 8 mm tapes, etc.) in any combination (a changer may have CD and DVD discs installed, etc.). The model of the present invention supports enhancements to the AV/C protocol for content navigation and selection, providing both a detailed and a general abstraction of content discovery and description, and allowing for a range of controllers (from very simple to very complex) to make use of its features. In addition, the present invention includes support for status reporting and notification mechanisms so that controllers are aware of what is occurring within the device, and thus keep the user informed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. In a home audio visual network including a plurality of devices coupled via an IEEE 1394 bus, a system for accessing a media changer mechanism of a multi-item media player, comprising:

a multi-item media player for storing a plurality of media items and playing any of the plurality of media items;

a media changer mechanism within the multi-item media player, the media changer mechanism having a plurality of slots for storing the plurality of media items, the media changer mechanism configured to play any of the plurality of media items;

a computer system within the multi-item media player, the computer system coupled to the media changer mechanism, the computer system having a processor coupled to a memory; and a software based media changer model executing within the computer system, the media changer model comprised of computer readable code which when executed by the processor cause the computer system to perform a method for accessing the media changer mechanism, the method comprising the computer system performing the steps of:

interfacing with a plurality of devices coupled to the multi-item media player via an IEEE 1394 communications link of an IEEE 1394 based network;

providing a standardized command set for the media changer mechanism to provide a set of standardized commands that allow the plurality of devices to access the media changer mechanism such that the plurality of devices can access any of the plurality of media items; and providing content discovery functionality for the plurality of media items for allowing the plurality of devices to discover the content of the plurality of media items prior to accessing any of the plurality of media items.

2. The system of claim 1, wherein the multi-item media player is a disc-based multi-item media player and wherein the plurality of media items are a plurality of discs.

3. The system of claim 1 wherein the multi-item media player includes at least one drive coupled to the media changer mechanism, the drive configured to accept and play one of the plurality of media items, the one media item loaded by the media changer mechanism.

4. The system of claim 1 wherein the media changer model interfaces with the plurality of devices using AV/C protocols, the standardized command set being an extension of the AV/C protocols.

5. The system of claim 4 wherein the computer system further performs the step of providing enhancements to the AV/C protocols for content navigation and selection for the plurality of media items by providing a detailed abstraction and a general abstraction of content discovery functionality of the media changer mechanism.

6. The system of claim 1 wherein the media changer mechanism includes at least one removable multi-item cartridge for containing the plurality of media items.

7. In an IEEE 1394 based home audio visual network including a plurality of devices coupled via respective IEEE 1394 communications links, a media type independent system for accessing a disc changer mechanism for a multi-disc media player coupled to the network, comprising:

a multi-disc media player for storing a plurality of media discs;

a disc changer mechanism coupled to the multi-disc media player, the disc changer mechanism having a plurality of slots for storing the plurality of media discs, the disc changer mechanism configured to play any of the plurality of media discs;

a disc drive coupled to the disc changer mechanism for playing the media discs, the disc drive configured to accept media discs as loaded by the disc changer mechanism;

a computer system within the multi-disc media player, the computer system coupled to the disc changer mechanism and the disc drive, the computer system having a processor coupled to a memory; and a software based media changer model executing within the computer system, the media changer model comprised of computer readable code which when executed by the processor cause the computer system to perform a method for accessing the disc changer mechanism, the method comprising the computer system performing the steps of:

interfacing with a plurality of devices coupled to the multi-disc media player via an IEEE 1394 communications link of an IEEE 1394 based network;

providing a standardized command set for the disc changer mechanism to provide a set of standardized commands that allow the plurality of devices to access the disc changer mechanism such that the plurality of devices can access any of the plurality of media discs; and providing content discovery functionality for the plurality of media discs for allowing the plurality of devices to discover the content of the plurality of media discs prior to accessing any of the plurality of media discs.

8. The system of claim 7 wherein the media changer model interfaces with the plurality of devices using AV/C protocols, the standardized command set being an extension of the AV/C protocols.

9. The system of claim 8 wherein the computer system further performs the step of providing enhancements to the AV/C protocols for content navigation and selection for the plurality of media discs by providing a detailed abstraction and a general abstraction of content discovery functionality of the disc changer mechanism.

10. The system of claim 7 wherein the disc changer mechanism includes at least one removable multi-item cartridge for containing the plurality of media discs.

11. The system of claim 7 wherein the media changer model includes a media changer identifier descriptor software data structure describing the features and capability of the disc changer mechanism.

12. The system of claim 7 wherein the media changer model includes a media changer status descriptor software data structure describing a current status of the disc changer mechanism.

13. The system of claim 7 wherein the media changer model includes an object list software data structure for tracking the contents of the disc changer mechanism.

14. The system of claim 7 wherein the media changer model includes command software data structures for controlling the function of the disc changer mechanism.

15. In an IEEE 1394 based home audio visual network including a plurality of devices coupled via respective IEEE 1394 communications links, a method for type independent accessing of a disc changer mechanism of a multi-disc media player coupled to the network, comprising:

storing a plurality of media disks in a disc changer mechanism within a multi-disc media player;

playing one of the plurality of media discs using a disc drive coupled to the disc changer mechanism, the disc drive configured to accept media discs as loaded by the disc changer mechanism;

interfacing a plurality of devices coupled to the multi-disc media player via an IEEE 1394 communications link of an IEEE 1394 based network using a computer system within the multi-disc media player, the computer system having a processor coupled to a memory for executing a software based media changer model, the media changer model comprised of computer readable code which when executed by the processor cause the computer system to perform the steps of:

providing a standardized command set for the disc changer mechanism to provide a set of standardized commands that allow the plurality of devices to access the disc changer mechanism such that the plurality of devices can access any of the plurality of media discs;

interfacing the disc changer mechanism with the plurality of devices using AV/C protocols, the standardized command set being an extension of the AV/C protocols; and providing content discovery functionality for the plurality of media discs for allowing the plurality of devices to discover the content of the plurality of media discs prior to accessing any of the plurality of media discs.

16. The method of claim 15 wherein the computer system further performs the step of providing enhancements to the AV/C protocols for content navigation and selection for the plurality of media discs by providing a detailed abstraction and a general abstraction of content discovery functionality of the disc changer mechanism.

17. The method of claim 15 wherein the disc changer mechanism includes at least one removable multi-disc cartridge for containing the plurality of media discs.

18. The method of claim 15 wherein the disc changer mechanism includes a carousel for containing the plurality of media discs.

19. The method of claim 15 wherein the media changer model includes a media changer identifier descriptor software data structure describing the features and capability of the disc changer mechanism.

20. The method of claim 15 wherein the media changer model includes a media changer status descriptor software data structure describing a current status of the disc changer mechanism.

21. The method of claim 15 wherein the media changer model includes an object list software data structure for tracking the contents of the disc changer mechanism.

22. The method of claim 15 wherein the media changer model includes command software data structures for controlling the function of the disc changer mechanism.

23. In a home audio visual network including a plurality of devices coupled via an IEEE 1394 bus, a system for accessing a media changer means of a multi-item media player, comprising:

a means for storing a plurality of media items and playing any of the plurality of media items;

a media changer means within the multi-item media player, the media changer means having a plurality of slots for storing the plurality of media items, the media changer means configured to play any of the plurality of media items;

a computer system means within the multi-item media player, the computer system means coupled to the media changer mechanism; and a software based media changer model executing within the computer system means, the media changer model comprised of computer readable code which when executed by the processor cause the computer system to perform a method for accessing the media changer means, the method comprising the computer system performing the steps of:

interfacing with a plurality of devices coupled to the multi-item media player via an IEEE 1394 communications link of an IEEE 1394 based network;

providing a standardized command set for the media changer mechanism to provide a set of standardized commands that allow the plurality of devices to access the media changer mechanism such that the plurality of devices can access any of the plurality of media items; and providing content discovery functionality for the plurality of media discs for allowing the plurality of devices to discover the content of the plurality of media discs prior to accessing any of the plurality of media discs.

* * * * *